United States Patent
Ishii et al.

(10) Patent No.: US 9,550,525 B2
(45) Date of Patent: Jan. 24, 2017

(54) STEERING WHEEL

(71) Applicant: TOYODA GOSEI CO., LTD., Kiyosu-shi, Aichi-ken (JP)

(72) Inventors: Tsutomu Ishii, Kiyosu (JP); Osamu Hirose, Kiyosu (JP); Kenji Sasaki, Kiyosu (JP); Toshihito Yanagisawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/810,844

(22) Filed: Jul. 28, 2015

(65) Prior Publication Data
US 2016/0031480 A1    Feb. 4, 2016

(30) Foreign Application Priority Data
Jul. 30, 2014 (JP) .................. 2014-154944

(51) Int. Cl.
| B60R 21/203 | (2006.01) |
| B60Q 5/00 | (2006.01) |
| B62D 7/22 | (2006.01) |
| B60R 21/2165 | (2011.01) |

(52) U.S. Cl.
CPC .............. *B62D 7/222* (2013.01); *B60Q 5/003* (2013.01); *B60R 21/203* (2013.01); *B60R 21/2037* (2013.01); *B60R 21/21658* (2013.01)

(58) Field of Classification Search
CPC ............ B60R 21/2037; B60R 21/21658; B60R 21/2035; B60R 21/203; B60Q 5/003
USPC ............... 280/731; 200/61.55, 61.54
See application file for complete search history.

(56) References Cited

U.S. PATENT DOCUMENTS

| 8,720,942 B2* | 5/2014 | Onohara ............ B60R 21/2037 200/61.55 |
| 2009/0218739 A1* | 9/2009 | Terada ............... B60R 21/2037 267/2 |
| 2012/0080868 A1* | 4/2012 | Banno ................ B60R 21/2037 280/728.2 |
| 2013/0076011 A1 | 3/2013 | Umemura et al. |
| 2014/0131982 A1 | 5/2014 | Ishii et al. |

FOREIGN PATENT DOCUMENTS

| JP | 2012-56461 A | 3/2013 |
| JP | 2013-71626 A | 4/2013 |
| JP | 2014-111426 A | 6/2014 |

* cited by examiner

Primary Examiner — Keith Frisby
(74) Attorney, Agent, or Firm — Posz Law Group, PLC

(57) ABSTRACT

A steering wheel includes: a cylindrical slider which is disposed on an outer side of a support member so as to slide in a front-to-rear direction and which is biased to the rear; a cap member which covers at least respective rear end portions of the support member and the slider from the rear; a movable-side contact portion which is provided inside the cap member; an annular damper holder which is mounted inside the cap member; an annular elastic member which is interposed between the slider and the damper holder; a transmitting portion which is provided in an inner circumferential portion of the damper holder; and a movement catch portion which is provided on an outer circumferential portion of the slider so as to be positioned immediately before the transmitting portion and to which a forward movement of the damper holder is transmitted through the transmitting portion.

7 Claims, 10 Drawing Sheets

STEERING WHEEL

CROSS-REFERENCE TO RELATED APPLICATION(S)

This application is based upon and claims the benefit of priority from Japanese Patent Application No. 2014-154944, filed on Jul. 30, 2014, the entire contents of which are incorporated herein by reference.

BACKGROUND

1. Field of the Invention

The present invention relates to a steering wheel of a vehicle such as a motor vehicle which is operated to be turned in changing a traveling direction or a reversing direction of the vehicle.

2. Description of the Related Art

As one mode of a steering wheel, there is a steering wheel which includes an air bag module for protecting the driver of a vehicle such as a motor vehicle from impact that would be exerted on the driver when the impact is applied to the vehicle from the front thereof (for example, refer to JP-A-2013-71626). As shown in FIG. 10, this steering wheel also includes a horn switch mechanism which activates a horn module 60 to operate in addition to an air bag module 50.

The horn switch mechanism includes an elastic member 51, a support member 52, a slider 53, a spring 54, a cap member 55 and a movable-side contact portion 56. The elastic member 51 has an annular shape and is mounted on a bag holder 57 of the air bag module 50. The support member 52 is supported in a metal core 59 of the steering wheel in such a state that the support member 52 is inserted through the elastic member 51. A rear end portion of the support member 52 constitutes a fixed-side contact portion 52a. The slider 53 is disposed so as to slide in a front-to-rear direction relative to the support member 52 between the elastic member 51 and the support member 52 and is biased to the rear by the spring 54. The cap member 55 contacts a rear end portion of the slider 53 and covers at least the end portions of the support member 52 and the slider 53 from the rear. The movable-side contact portion 56 is installed inside the cap member 55 and is connected electrically to the horn module 60 by way of the bag holder 57 and the like.

In the steering wheel having the horn switch mechanism which is configured in the way described above, the movable-side contact portion 56 is spaced away to the rear from the fixed-side contact portion 52a when the air bag module 50 is not depressed. This cuts off an electrical communication between the contact portions 52a, 56, and hence, the horn module 60 is not activated. In this situation, the air bag module 50 functions as the mass of a dynamic damper, and the elastic member 51 functions as a spring of the dynamic damper. Because of this, when the steering wheel vibrates, the elastic member 51 vibrates together with the air bag module 50 at a resonant frequency of the same as or near a frequency at which the steering wheel vibrates while being elastically deformed to thereby absorb vibration energy of the steering wheel. This absorption of the vibration energy restricts (dampens) the vibration of the steering wheel.

On the other hand, when the air bag module 50 is depressed, the force exerted on the air bag module 50 is transmitted to the movable-side contact portion 56 and the slider 53 via the cap member 55. Then, the slider 53 is pressed by the cap member 55 and is then caused to slide to the front against the spring 54. Additionally, when the movable-side contact portion 56 moves to the front together with the cap member 55 to be brought into contact with the fixed-side contact portion 52a of the support member 52 to thereby establish an electrical communication therebetween, the horn module 60 is activated to operate.

The steering wheel is constructed, as has been described above, so that the force applied to the air bag module 50 is transmitted directly to the slider 53 via the cap member 55. Because of this, when the air bag module 50 is depressed to activate the horn module 60, the slider 53 which is pressed by the cap member 55 is caused to slide to the front while compressing the spring 54. This increases the operation load of the air bag module 50 according to the operation or depression amount thereof when the air bag module 50 is depressed to thereby improve the operation feeling of the air bag module 50.

However, the steering wheel is constructed so that the rear end portion of the slider 53 rubs against the cap member 55 at all times while the weight of the air bag module 50 being exerted thereon. Thus, in attempting to restrict (dampen) the vibration of the steering wheel by the air bag module 50 (the damper mass) and the elastic member 51 (the spring), the resonant frequency is not stabilized depending upon how the rear end portion of the slider 53 rubs against the cap member 55. Additionally, the resonant frequency tends to fluctuate as the vibration which is inputted from the vehicle (the motor vehicle) side fluctuates. For example, when a small magnitude of vibration is inputted, the sliding resistance of the slider 53 against the camp member 55 becomes dominant in relation to the resonant frequency, resulting in a tendency for the resonant frequency to become high relatively.

SUMMARY

The invention has been made in view of these situations, and an object thereof is to provide a steering wheel which can restrict the vibration thereof with a stable resonant frequency while improving the operation feeling of an air bag module when the air bag module is depressed.

According to an aspect of the invention, there is provided a steering wheel including: a support member which is inserted through a bag holder of an air bag module; a cylindrical slider which is disposed on an outer side of the support member so as to slide in a front-to-rear direction and which is biased to the rear by a biasing member; a cap member which covers at least respective rear end portions of the support member and the slider from the rear in such a state that the cap member is spaced away to the rear from the rear end portion of the slider; a movable-side contact portion which is provided inside the cap member; an annular damper holder which is mounted inside the cap member while covering part of the slider; an annular elastic member which is interposed between the slider and the damper holder; a transmitting portion which is provided in an inner circumferential portion of the damper holder; and a movement catch portion which is provided on an outer circumferential portion of the slider so as to be positioned immediately before the transmitting portion and to which a forward movement of the damper holder is transmitted through the transmitting portion, wherein when the air bag module is not depressed, the air bag module is caused to function as damper mass of a dynamic damper and elastic member is caused to function as a spring of the dynamic damper, whereas when the air bag module is depressed, the slider is caused to slide to the front against the biasing member by causing the cap member to move to the front in association with the depression of the air bag module, and in the sliding process, the movable-side contact portion is brought into contact with the rear end portion of the support member to thereby activate a horn module.

According to this configuration, when the air bag module is not depressed, the load of the air bag module is transmitted to the slider via mainly the cap member, the damper holder and the elastic member.

Because of this, when the steering wheel vibrates, the air bag module functions as the damper mass of the dynamic damper, and the elastic member functions as the spring of the dynamic damper. The elastic member vibrates together with the air bag module while being deformed elastically at the resonant frequency which is the same as or near the frequency at which the steering wheel vibrates to thereby absorb the vibration energy of the steering wheel. The vibration of the steering wheel is restricted (damped) by the absorption of the vibration energy.

As this occurs, since the rear end portion of the slider is spaced away to the front from the cap member, the rear end portion of the slider does not rub against the cap member. Thus, no sliding resistance is generated between the rear end portion of the slider and the cap member. This eliminates the influence on the resonant frequency by the sliding resistance, whereby the resonant frequency is stabilized. Additionally, although the vibration inputted from the vehicle side changes, the target resonant frequency of the dynamic damper is made difficult to change.

On the contrary, when the air bag module is depressed to activate the horn module, the force applied to the air bag module is transmitted to the movable-side contact portion and the damper holder via the cap member. The force so transmitted moves the damper holder to the front together with the transmitting portion, and the movement of the transmitting portion is transmitted to the slider via the movement catch portion. The slider is moved to the front against a biasing member. Additionally, the movable-side contact portion moves to the front together with the cap member to be brought into contact with the rear end portion of the support member to thereby establish an electrical communication therebetween, whereupon the horn module is activated. When the air bag module is depressed, the operation load increases according to the operation amount of the air bag module, and therefore, the operation feeling is improved.

Besides, the transmitting portion may be in direct contact with the movement catch portion or in contact with the movement catch portion indirectly via an elastic plate-shaped portion which is formed on an outer circumferential portion of a front end of the elastic member.

According to this configuration, when the air bag module is depressed to activate the horn module, the cap member is pushed, and the damper holder is caused to move to the front. In association with this forward movement of the damper holder, the transmitting portion moves to the front, and this forward movement is transmitted directly to the movement catch portion which is positioned immediately before the transmitting portion or is transmitted indirectly to the movement catch portion via the elastic plate-shaped portion which is formed on the outer circumferential portion of the front end of the elastic member. The transmission of the movement of the transmitting portion causes the slider to slide to the front against the biasing member.

In the case of the elastic plate-shaped portion being interposed between the transmitting portion and the movement catch portion, when the damper holder is caused to move to the front, the elastic plate-shaped portion is pressed to be elastically deformed by the transmitting portion. However, since the thickness of the elastic plate-shaped portion is small, the elastic plate-shaped portion is elastically deformed only slightly. Because of this, the elastic deformation of the elastic plate-shaped portion affects only slightly the operation feeling of the air bag module when the air bag module is depressed.

Additionally, interposing the elastic plate-shaped portion which has the elasticity although it is slight between the transmitting portion and the movement catch portion restricts the generation of a striking sound which would otherwise occur as a result of the transmitting portion which is hard being brought into direct contact with the movement catch portion which is also hard.

Besides, a catch portion which catches a rearward biasing force of the biasing member may be provided on an outer circumferential portion of the slider and the movement catch portion may be made up of the catch portion.

According to this configuration, the catch portion which is provided on the outer circumferential portion of the slider so as to catch the rearward biasing force of the biasing member also functions as the movement catch portion to catch the forward acting force which is transmitted through the transmitting portion of the damper holder. Because of this, a movement catch portion does not have to be formed separately from the catch portion, and the shape of the slider becomes simple compared with a case where the movement catch portion is formed separately.

Besides, the support member may include a shaft portion which extends in a depressing direction of the air bag module and a collar portion which is formed on an outer circumferential portion of a rear end of the shaft portion, a main portion of the slider may be made up of a cylindrical portion which is placed on the shaft portion slidably; and a rear end portion of the cylindrical portion may make up the rear end portion of the slider.

According to this configuration, the rear end portion of the cylindrical portion which is placed on the shaft portion of the support member so as to slide thereon makes up the rear end portion of the slider. This rear end portion of the cylindrical portion is positioned further forwards than the collar portion of the support member. This means that no constituent portion of the slider is present further rearwards than the rear end portion of the cylindrical portion. Consequently, no constituent portion of the slider is present not only further rearwards than the collar portion but also around the collar portion. As a result of this, in case the slider has a portion which surrounds the collar portion at the rear portion thereof, there are fears that the portion which surrounds the collar portion is brought into contact with the circumferential wall portion of the cap member when the vehicle is being driven on rough roads. However, according to the configuration described above, such a contact is made difficult to occur.

Besides, at least a rear portion of the elastic member may be made up of an annular elastic main body portion which functions as the spring of the dynamic damper; a gap portion may be defined between the elastic main body portion and the collar portion; and a rib may be provided at a portion on a rear surface of the elastic main body portion so as to project to the rear to thereby be brought into contact with a portion on a front surface of the collar portion.

According to this configuration, the gap portion is defined between the elastic main body portion and the collar portion, whereby the elastic main body portion can also be deformed elastically in this gap portion. Compared with a case where the gap portion is not defined, the elastic main body portion is allowed to be deformed elastically more easily. Consequently, the elastic main body portion can easily be vibrated together with the air bag module while being elastically deformed at the target resonant frequency.

On the other hand, in case the whole of the rear surface of the elastic main body portion is spaced away from the collar portion, when both are brought into contact with each other, a striking sound is made more or less. However, by adopting the configuration described above, the rib which projects to the rear from the portion on the rear surface of the elastic main body portion is in contact with the portion on the front surface of the collar portion at all times, and therefore, the impetus with which the collar portion and the elastic main body portion approach each other is dampened by the elastic deformation of the rib, whereby the generation of the striking sound is restricted.

Besides, the elastic member may include an elastic cylindrical portion which extends to the front from the elastic main body portion; and a gap portion may be defined between the elastic cylindrical portion and the transmitting portion.

According to this configuration, the gap portion is defined between the elastic cylindrical portion and the transmitting portion, whereby the elastic cylindrical portion can also be deformed elastically in this gap portion. Compared with a case where the gap portion is not defined, the elastic cylindrical portion can be deformed elastically more easily. As a result of this, the elastic cylindrical portion affects only slightly the resonant frequency by the elastic main body portion.

According to the steering wheel described above, the vibration thereof can be restricted with the stable resonant frequency while improving the operation feeling of the air bag module when the air bag module is depressed.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIGS. 1A and 1B show an embodiment of a steering wheel of a vehicle, in which FIG. 1A is a side view of the steering wheel, and FIG. 1B is a front view of the steering wheel showing a position where an air bag module is disposed;

DETAILED DESCRIPTION OF THE INVENTION

Hereinafter, an embodiment of a steering wheel of a vehicle will be described by reference to FIGS. 1A to 9B.

Figure 1A:
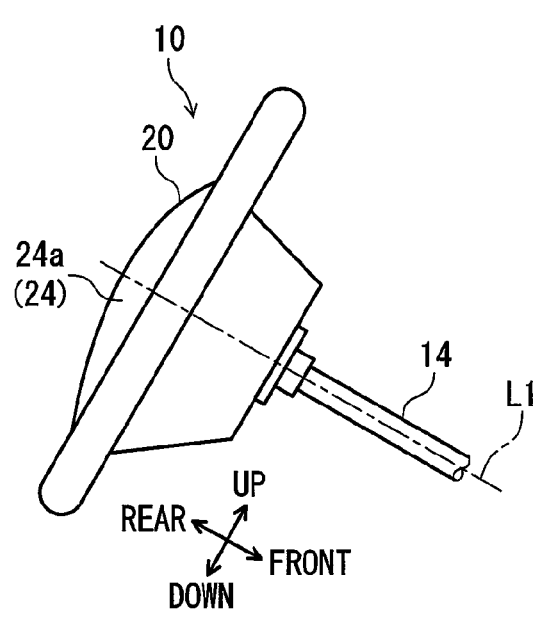

As shown in FIG. 1A, a steering shaft 14, which extends substantially in a front-to-rear direction of a vehicle along an axis L1 and turns about the axis L1, is provided on the vehicle while being inclined so that a rear end side thereof is positioned higher. A steering wheel 10 is attached to a rear end portion of the steering shaft 14.

In this embodiment, individual portions of the steering wheel 10 will be described based on the axis L1 of the steering shaft 14. A direction along the axis L1 will be referred to as a "front-to-rear direction" of the steering wheel 10. In directions along a plane which intersects the axis L1 at right angles, a direction in which the steering wheel 10 rises will be referred to as an "up-to-down direction" of the steering wheel 10. Consequently, the front-to-rear direction and the up-to-down direction of the steering wheel 10 are inclined slightly with respect to a front-to-rear direction (a horizontal direction) and an up-to-down direction (a vertical direction) of the vehicle.

In FIGS. 2 to 9A, as a matter of convenience, the front-to-rear direction of the steering wheel 10 is depicted as coinciding with the horizontal direction, and the up-to-down direction of the steering wheel 10 is depicted as coinciding with the vertical direction. This will be true in FIG. 10 which shows the prior art.

Figure 1B:
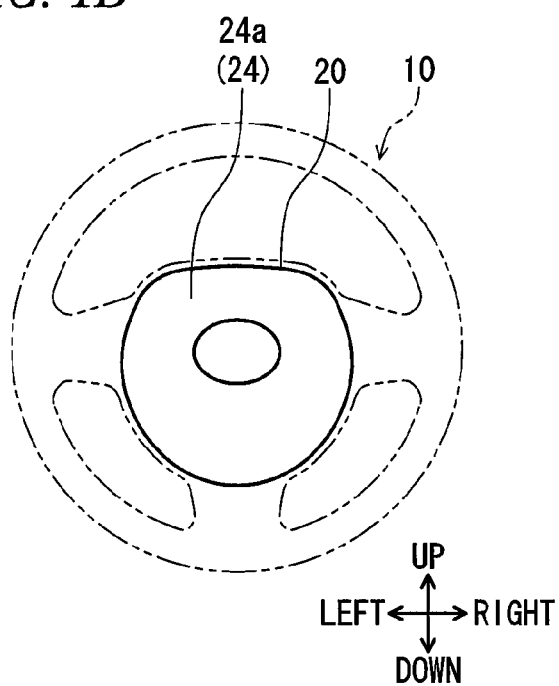
Figure 4:
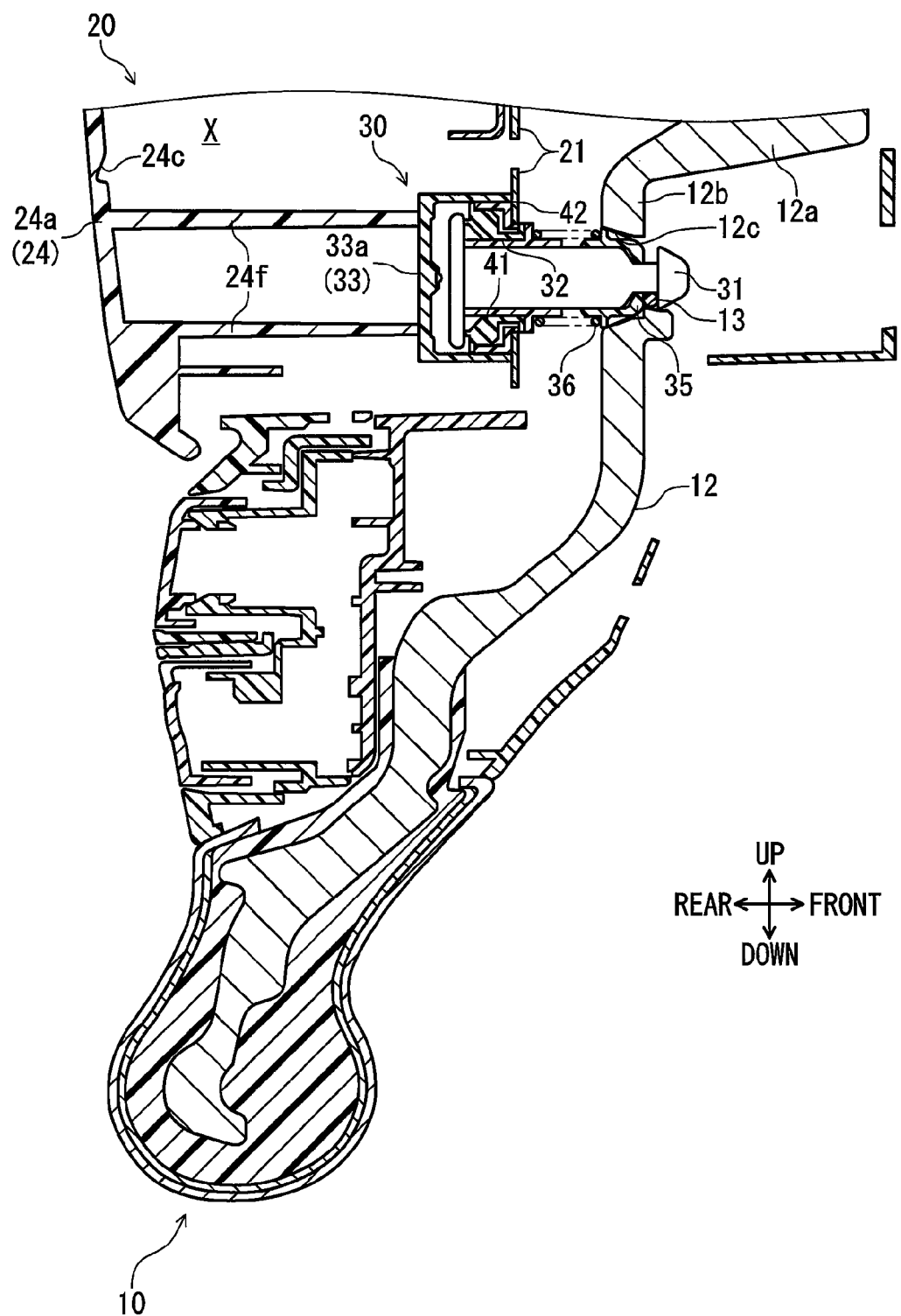
FIG. 4 is a partial vertical sectional view of the steering wheel of the embodiment.

As shown in FIG. 1B, the steering wheel 10 includes an air bag module 20 in a central portion. As shown in FIG. 4, a framework portion of the steering wheel 10 is made up of a metal core 12. The metal core 12 is made of iron, aluminum, magnesium or an alloy thereof. The metal core 12 is attached to the steering shaft 14 at a boss portion 12a which is positioned at a central portion thereof and turns together with the steering shaft 14.

Holding portions 12b each having a through hole 12c are provided at a plurality of locations around a circumference of the boss portion 12a on the metal core 12. Each through hole 12c has a tapered inner wall surface which expands diametrically towards a rear end side thereof.

Figure 7:
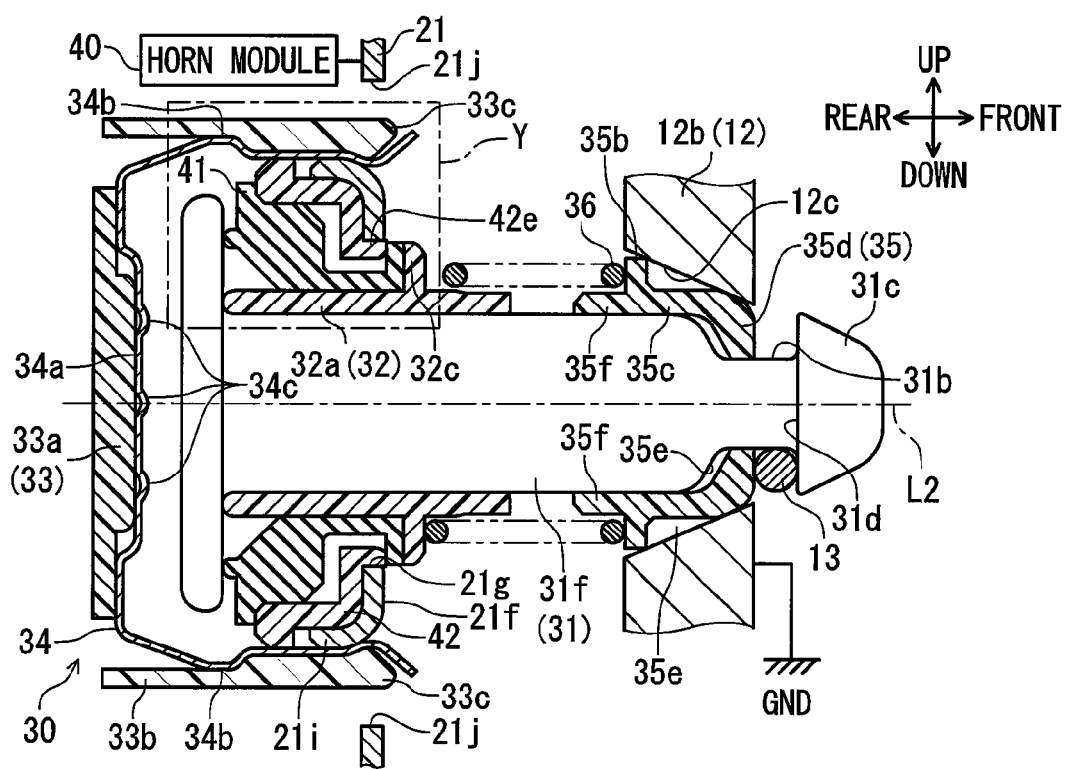
FIG. 7 is a partial vertical sectional view showing a sectional construction of the horn switch mechanism and a peripheral portion thereof in the steering wheel of the embodiment.

As shown in FIG. 7, a clip 13 is disposed at a front side of each holding portion 12b. The clip 13 is formed by bending curvilinearly a wire material made of a metal such as a spring steel which is electrically conductive into a predetermined shape. The clip 13 is partially in contact with the metal core 12. Part of each clip 13 is positioned near the front of the through hole 12c.

A horn module 40 is provided on the vehicle, and a plurality of horn switch mechanisms 30 (refer to FIGS. 2, 5) which activate the horn module 40 to operate are mounted on the metal core 12 by being snap fitted in the corresponding through holes 12c in the holding portions 12b. The horn switch mechanisms 30 have the same configuration. Then, the air bag module 20 is supported on the metal core 12 via these horn switch mechanisms 30. In this way, each horn switch mechanism 30 functions not only to support the air bag module 20 but also to switch on and off the horn module 40.

Further, in this embodiment, an elastic member 41 and a damper holder 42 are interposed between a bag holder 21 of the air bag module 20 and each horn switch mechanism 30. Then, a vibration damping construction for restricting or damping the vibration of the steering wheel 10 is made up of the metal core 12, the air bag module 20, the horn switch mechanisms 30, the elastic members 41, the damper holders 42 and the like. Next, the constituent components which constitute the vibration damping construction will individually be described.

<Air Bag Module 20>

Figure 3:
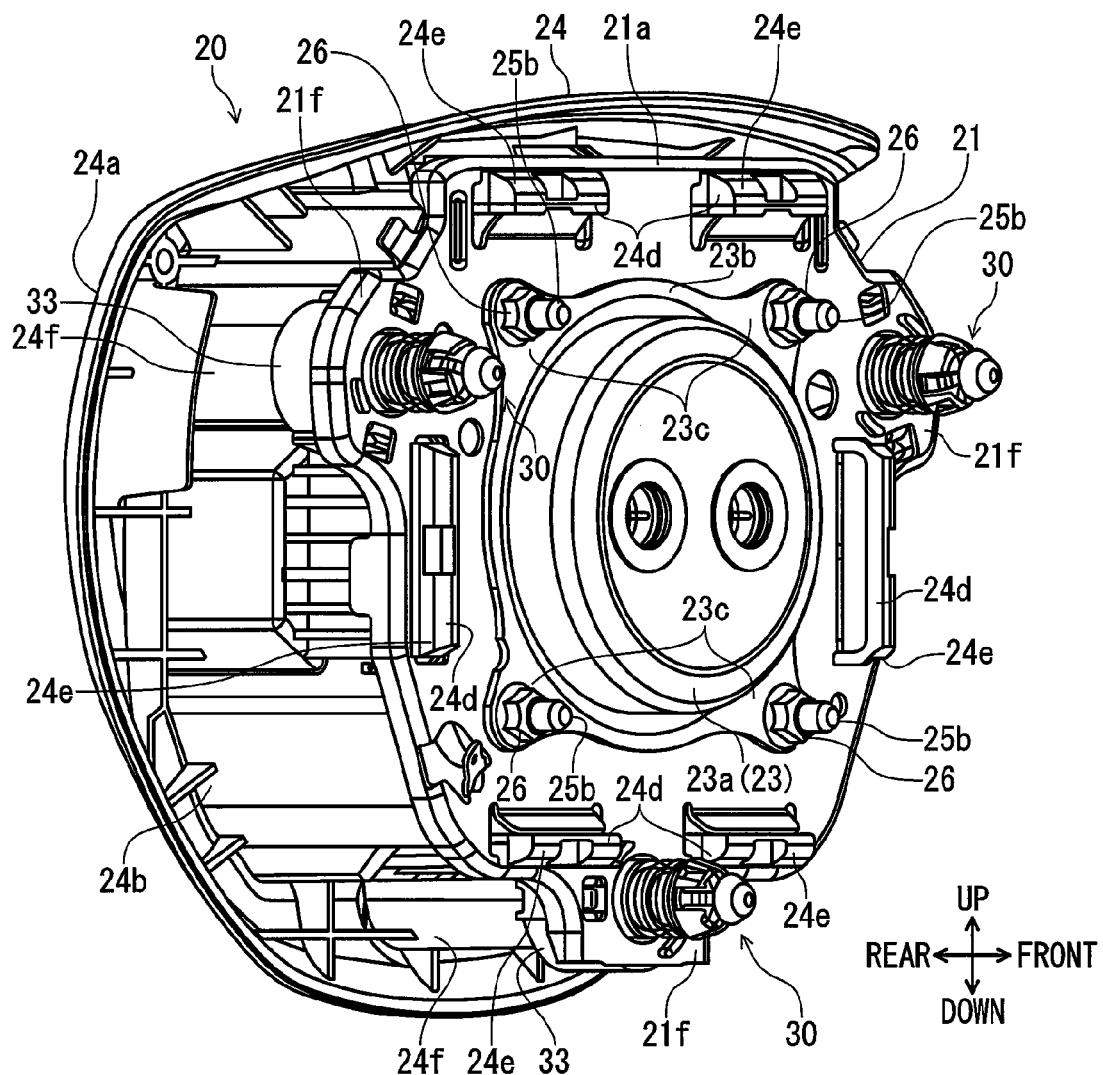
FIG. 3 is a perspective view of the air bag module in the steering wheel of the embodiment.
Figure 5:
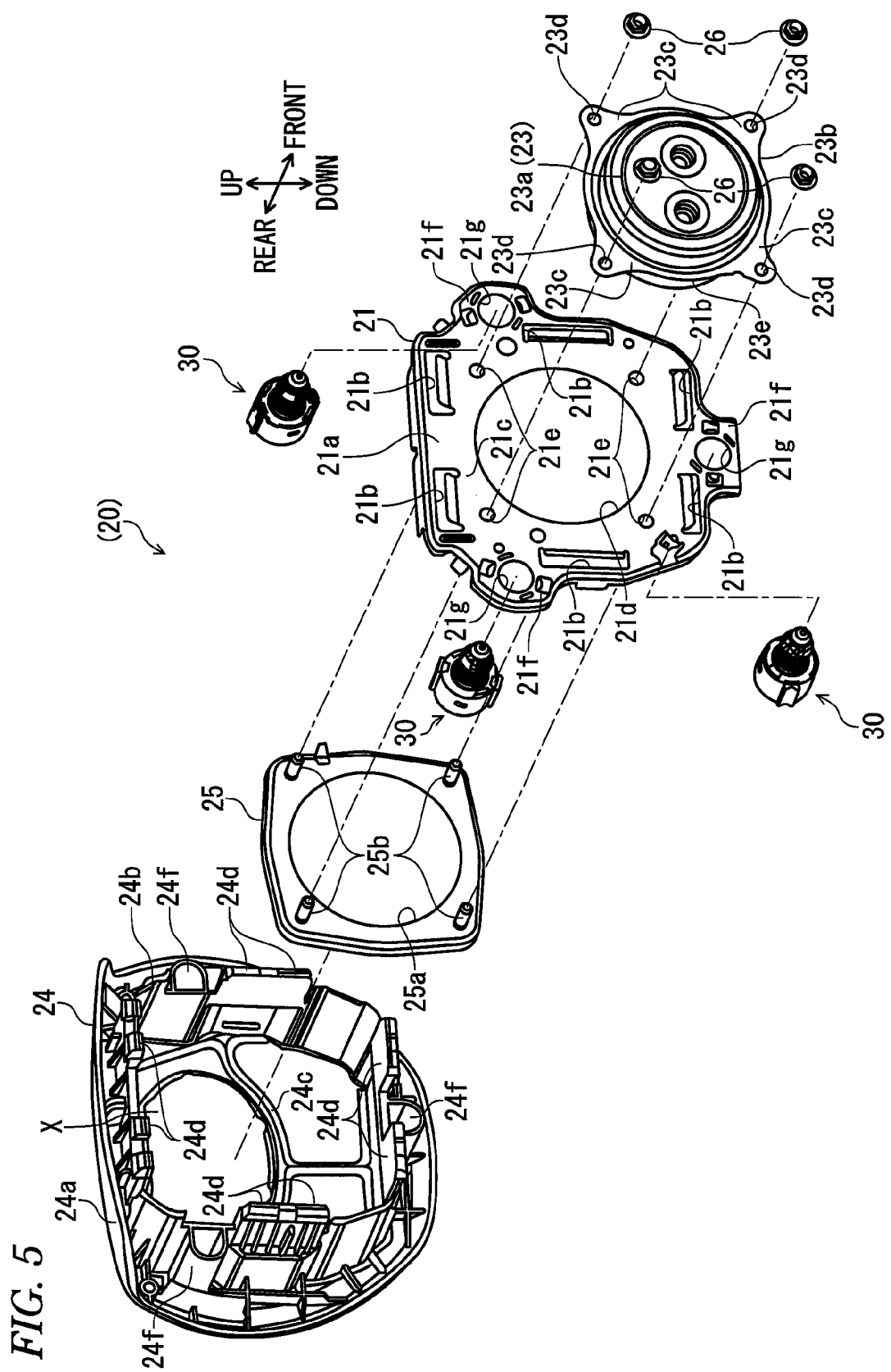
FIG. 5 is an exploded perspective view of the air bag module in the steering wheel of the embodiment.

As shown in FIGS. 3 to 5, the air bag module 20 is made by assembling a pad portion 24, a ring retainer 25, an air bag (not shown) and an inflator 23 to the bag holder 21.

The pad portion 24 has an outer skin portion 24a which constitutes a designed front surface (a rear surface) and a substantially quadrangular ring-shaped accommodating wall portion 24b which is provided on a rear surface side (a front side) of the outer skin portion 24a so as to rise therefrom. A space defined by the outer skin portion 24a, the accommodating wall portion 24b and the bag holder 21 constitutes mainly a bag accommodating space x for accommodating the air bag (not shown) therein. A thin portion 24c is formed in a portion of the outer skin portion 24a where the bag accommodating space x is formed so as to be pressed to be broken by the air bag when the air bag is deployed and inflated.

A plurality of locking claws 24d, each having a rectangular plate-like shape, are formed integrally at a front end portion of the accommodating wall portion 24b. A locking projection 24e is formed at a front end portion of each locking claw 24d so as to project outwards (to move away from the bag accommodating space x).

Switch support portions 24f are formed individually at a plurality of locations on the pad portion 24 so as to support the corresponding horn switch mechanisms 30. Each switch support portion 24f is formed integrally with the accommodating wall portion 24b so as to extend from the outer skin portion 24a to the rear surface side (the front side) of the pad portion 24.

Figure 6:
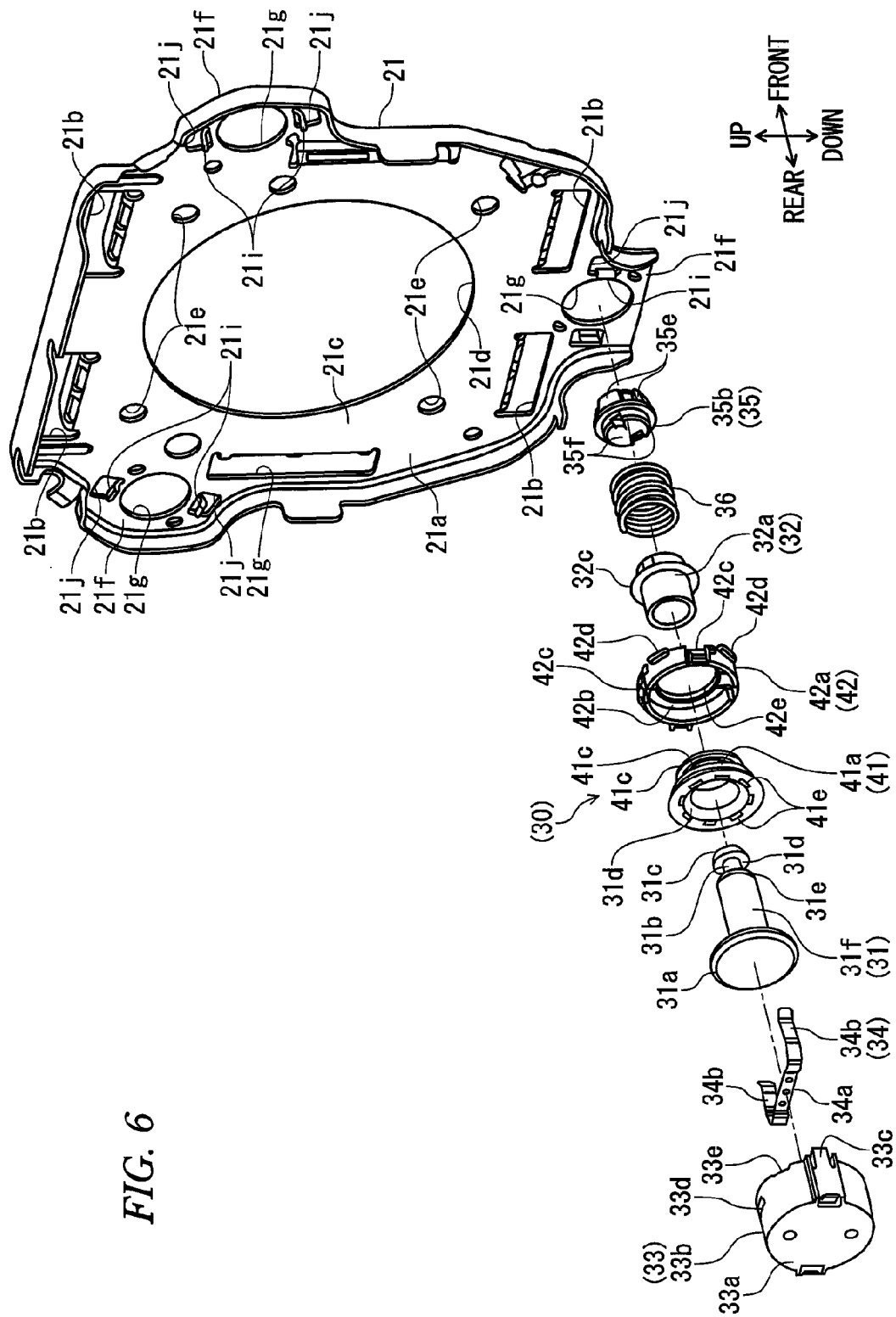
FIG. 6 is an exploded perspective view showing constituent components of the horn switch mechanism together with a bag holder of the steering wheel of the embodiment.

As shown in FIGS. 3, 5 and 6, the bag holder 21 is formed by pressing a metallic plate which is electrically conductive. In place of this, the bag holder 21 may be formed of a conductive metallic material through die-casting. A circumferential portion of the bag holder 21 is configured as a substantially quadrangular ring-shaped circumferential fixing portion 21a to which the pad portion 24 is fixed.

A slit-shaped claw locking hole 21b is formed at a location on the circumferential fixing portion 21a which lies in front of each locking claw 24d, so that a front end portion of each locking claw 24d is inserted through the claw locking hole 21b so formed to be locked therein.

A radially inward portion of the circumferential fixing portion 21a constitutes a table portion 21c. A circular opening portion 21d is formed in a central portion of the table portion 21c. Screw insertion holes 21e are formed in the table portion 21c at a plurality of locations thereon which lie near a circumferential edge portion of the opening portion 21d. The inflator 23 is attached to the table portion 21c with part thereof inserted though the opening portion 21d.

More specifically, the inflator 23 has a main body 23a having a low cylindrical shape, and a flange portion 23b is formed on an outer circumferential surface of the main body 23a. A plurality of mounting pieces 23c are provided on the flange portion 23b so as to extend radially outwards of the main body 23a. A screw insertion hole 23d is formed in each mounting piece 23c at a location thereon which lies in front of the screw insertion hole 21e in the bag holder 21. A portion of the inflator 23 which lies further rearwards than the flange portion 23b is configured as a gas jetting portion 23e from which inflation gas is jetted. Then, the gas jetting portion 23e of the inflator 23 is inserted through the opening portion 21d in the bag holder 21 from the front side so as to project to the bag accommodating space x side. Further, the flange portion 23b is brought into contact with the circumferential edge portion of the opening portion 21d, and in this state, the inflator 23 is attached to the bag holder 21 together with the ring retainer 25.

More specifically, the ring retainer 25 has a circular opening portion 25a which is similar to the opening portion 21d in the bag holder 21. Additionally, the ring retainer 25 has mounting screws 25b at a plurality of locations which lie behind the screw insertion holes 21e in the bag holder 21. An opening portion of the air bag (not shown), which is folded so as to be deployed for inflation, is disposed between the ring retainer 25 and the bag holder 21. The plurality of mounting screws 25b of the ring retainer 25 are inserted through screw insertion holes (not shown) which are provided along a circumferential edge portion of the opening portion of the air bag and the screw holes 21e, 23d in the bag holder 21 and the inflator 23 from the rear side. Further, nuts 26 are fastened on to the corresponding mounting screws 25b from the front side after the mounting screws 25b have been inserted through the screw insertion holes in the way described above, whereby the air bag is fixed to the back holder 21 via the ring retainer 25 and the inflator 23 is fixed to the bag holder 21.

Mounting portions 21f where the horn switch mechanisms 30 are mounted are formed at a plurality of locations along the circumferential fixing portion 21a of the bag holder 21 so as to project therefrom radially outwards of the circular opening portion 21d. The mounting portions 21f are positioned at locations which lie in front of the corresponding switch support portions 24f of the pad portion 24. A mounting hole 21g is formed in each mounting portion 21f. A plurality of holding portions 21i are formed integrally at a peripheral portion of each mounting hole 21g in the bag holder 21 so as to extend to the rear. In this embodiment, the holding portions 21i are formed by bending to the rear portions of the bag holder 21 which lie to face each other across each mounting hole 21g. As a result of each holding portion 21i being bent to be formed in the way described above, a hole 21j (refer to FIG. 7) is formed in the bag holder 21 radially outwards of each holding portion 21i, that is, on an opposite side to the mounting hole 21g across each holding portion 21i.

<Horn Switch Mechanism 30>

Figure 2:
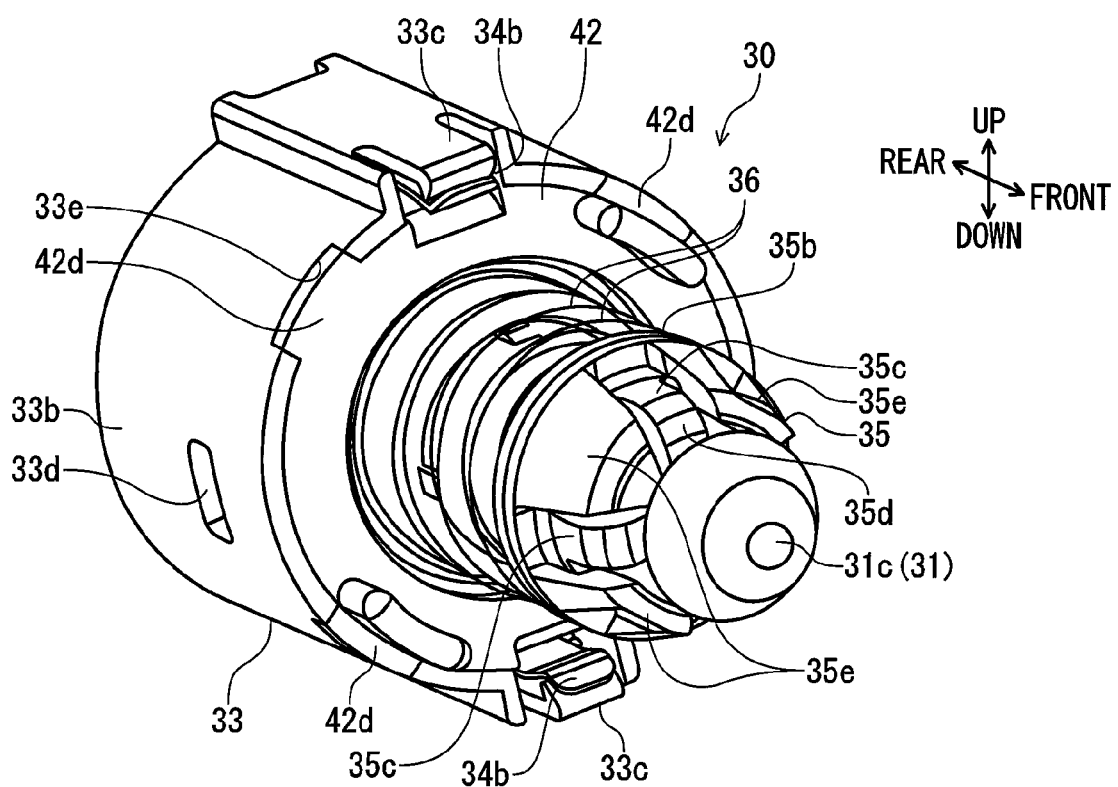
FIG. 2 is a perspective view of a horn switch mechanism in the steering wheel of the embodiment.

As shown in FIGS. 2, 6 and 7, each horn switch mechanism 30 includes a snap pin 31 as a support member, a pin holder 32 as a slider, a contact holder 33 as a cap member, a contact terminal 34 as a movable-side contact portion, a spring catch 35 and a coil spring 36 as a biasing member. Next, the constituent members of the horn switch mechanism 30 will be described.

<Snap Pin 31 (Support Member)>

The snap pin 31 is made of a metallic material which is electrically conductive. A supporting construction of this snap pin 31 on the metal core 12 will be described later. A main portion of the snap pin 31 is made up of a long shaft portion 31f which extends in the front-to-rear direction along an axis L2 which is parallel to the axis L1 of the steering shaft and which has a diameter smaller than a bore diameter of the mounting hole 21g in the bag holder 21. A rear end portion of the shaft portion 31*f* functions as fixed-side contact portion. An annular locking groove 31*b* is formed at a front end portion of the shaft portion 31*f*. A collar portion 31*a*, having a diameter greater than those of the other portions of the shaft portion 31*f*, is formed around an outer circumferential portion of a rear end of the shaft portion 31*f*. An outside diameter of the collar portion 31*a* is set to be greater than the bore diameter of the mounting hole 21*g* in the bag holder 21.

<Pin Holder 32 (Slider)>

As shown in FIGS. 7 to 9A, the pin holder 32 is formed of an insulating resin material. A main portion of the pin holder 32 is made up of a cylindrical portion 32*a* which is opened at front and rear ends. The cylindrical portion 32*a* is placed on an outer side of the shaft portion 31*f* of the snap pin 31. The pin holder 32 is used as a slider which slides along the shaft portion 31*f* when the horn switch mechanism 30 is activated to operate. A rear end portion of the cylindrical portion 32*a* makes up a rear end portion of the pin holder 32.

An annular catch portion 32*c* is formed on an outer circumferential portion of the cylindrical portion 32*a* so as to project radially outwards of the cylindrical portion 32*a*. The catch portion 32*c* functions to catch a rear end portion of the coil spring 36. Additionally, the catch portion 32*c* is formed at a location on the outer circumferential portion of the cylindrical portion 32*a* which lies immediately before a transmitting portion 42*e*, which will be described later. Further, the catch portion 32*c* is given an outside diameter which is set greater than a dimension required to catch the rear end portion of the coil spring 36. By setting the position where the catch portion 32*c* is formed and the outside diameter of the catch portion 32*c* in the way described above, the catch portion 32*c* also functions as a movement catch portion which catches a forward movement of the damper holder 42 which is transmitted thereto through the transmitting portion 42*e*.

<Contact Holder 33 (Cap Member)>

Figure 8:
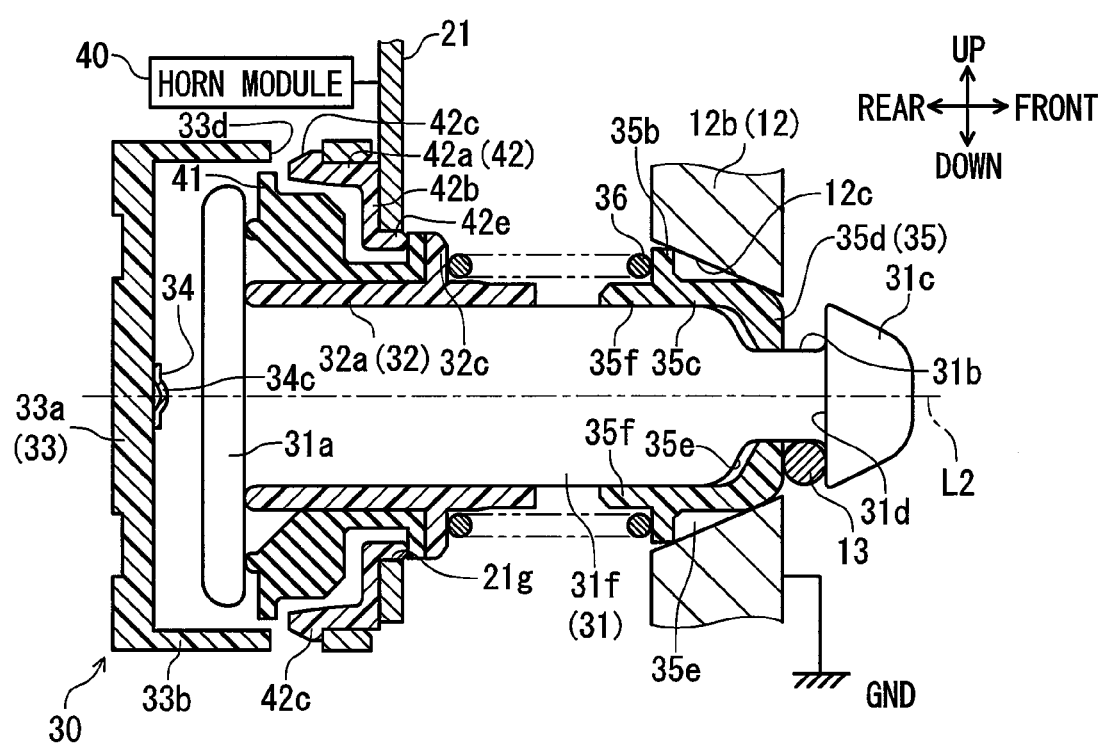
FIG. 8 is a partial vertical sectional view showing a sectional construction of the horn switch mechanism and the peripheral portion thereof which is taken along a different sectional plane from that of FIG. 7.

As shown in FIGS. 6 to 8, the contact holder 33 is formed of an insulating resin material. The contact holder 33 includes a substantially circular disc-like top plate portion 33*a* and a substantially cylindrical circumferential wall portion 33*b* which extends from an outer circumferential edge of the top plate portion 33*a* to the front. The contact holder 33 covers at least the collar portion 31*a* of the snap pin 31 and at least the rear end portion of the cylindrical portion 32*a* of the pin holder 32 from the rear while being spaced away to the rear from the rear end portion of the cylindrical portion 32*a* of the pin holder 32. Hook portions 33*c* are formed at a plurality of locations on the circumferential wall portion 33*b* which are spaced away circumferentially from each other. The hook portions 33*c* are elastically deformable in a radial direction.

Claw engagement holes 33*d* (refer to FIGS. 6 and 8) are formed at a plurality of locations which lie at a middle portion of the circumferential wall portion 33*b* in relation to the front-to-rear direction and which are spaced away circumferentially from each other. Additionally, arc-shaped notches 33*e* (refer to FIG. 2) are formed at a plurality of locations on a front end portion of the circumferential wall portion 33*b* which are spaced away circumferentially from each other.

<Contact Terminal 34 (Movable-Side Contact Portion)>

The contact terminal 34 is formed by pressing a strip-shaped metallic plate which is electrically conductive. The contact terminal 34 includes a main body portion 34*a* which extends in a diametric direction of the contact holder 33 and a pair of side portions 34*b* which extend from both ends of the main body portion 34*a* to the front.

A plurality of contact projecting portions 34*c* are formed at a plurality of locations on the main body portion 34*a* in relation to a longitudinal direction thereof so as to project to the front. Many of portions excluding the contact projecting portions 34*c* on a rear surface of the main body portion 34*a* are in contact with a front surface of the top plate portion 33*a* of the contact holder 33.

Each side portion 34*b* is in contact with an inner wall surface of the circumferential wall portion 33*b* of the contact holder 33 in an engaged fashion. As a result of the side portions 34*b* being in engagement with the inner wall surface, the contact terminal 34 is installed in the contact holder 33 while being positioned in place therein.

<Spring Catch 35>

As shown in FIGS. 2 and 7, the spring catch 35 is formed of an insulating resin material. Part of the spring catch 35 is made up of an annular plate-shaped catch portion 35*b*. The catch portion 35*b* has an outside diameter which is set to be almost the same as an outside diameter of the coil spring 36 and an outside diameter of an end portion of the inner wall surface of the through hole 12*c*, that is, a maximum diameter in the tapered inner wall surface of the through hole 12*c*.

Locking pieces 35*c* extend to the front from a plurality of locations on an inner circumferential portion of the catch portion 35*b* which are spaced away circumferentially from one another. A claw portion 35*d* is provided at a front end portion of each locking piece 35*c* so as to project radially inwards therefrom. Additionally, a plurality of engagement pieces 35*e* extend to the front from portions of the catch portion 35*b* which lie between the locking pieces 35*c* which lie adjacent to one another in the circumferential direction. An outer surface of each engagement piece 35*e* makes up part of a tapered surface which expands circumferentially wider as it extends to the rear.

A pair of mounting portions 35*f* extend from the catch portion 35*b* to the rear. Each mounting portion 35*f* is formed curvilinearly so as to expand radially outwards of the catch portion 35*b* in such a way as to correspond to an external shape of the shaft portion 31*f* of the snap pin 31.

The spring catch 35 is fitted on the shaft portion 31*f* of the snap pin 31 at the catch portion 35*b* and both the mounting portions 35*f*, and the claw portions 35*d* enter the locking groove 31*b*, whereby the spring catch 35 is mounted on the snap pin 31 so as not to be dislocated therefrom. As described above, in the spring catch 35, the outer surfaces of the plurality of engagement pieces 35*e* are disposed intermittently in the circumferential direction while holding the plurality of locking pieces 35*c* therebetween. By adopting this configuration, the spring catch 35 is allowed to have the same mode as a spring catch which has a tapered outer surface which expands circumferentially wider as it extends to the rear.

<Coil Spring 36 (Biasing Member)>

The coil spring 36 is wound round the shaft portion 31*f* of the snap pin 31, the cylindrical portion 32*a* of the pin holder 32 and both the mounting portions 35*f* of the spring catch 35. The coil spring 36 is disposed between a catch portion 32*c* of the pin holder 32 and the catch portion 35*b* of the spring catch 35 in a compressed state.

In this way, the plurality of single constituent components, that is, the snap pin 31, the pin holder 32, the contact holder 33, the contact terminal 34, the coil spring 36 and the spring catch 35 are assembled into a unit which makes up the horn switch mechanism 30. This allows the horn switch mechanism 30 which is formed into the unit to be handled as an assembly in mounting and replacing the horn switch mechanism 30.

<Elastic Member 41>

Figure 9A:
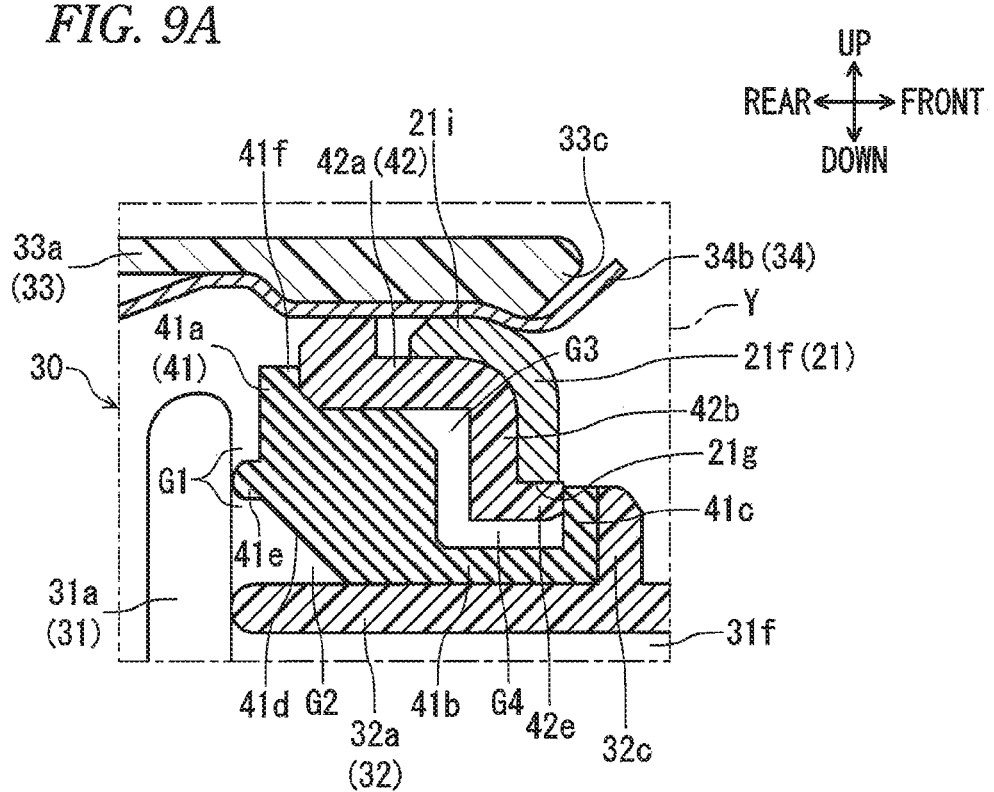
FIG. 9A is a partial vertical sectional view showing a portion Y in FIG. 7 in an enlarged fashion.
Figure 10:
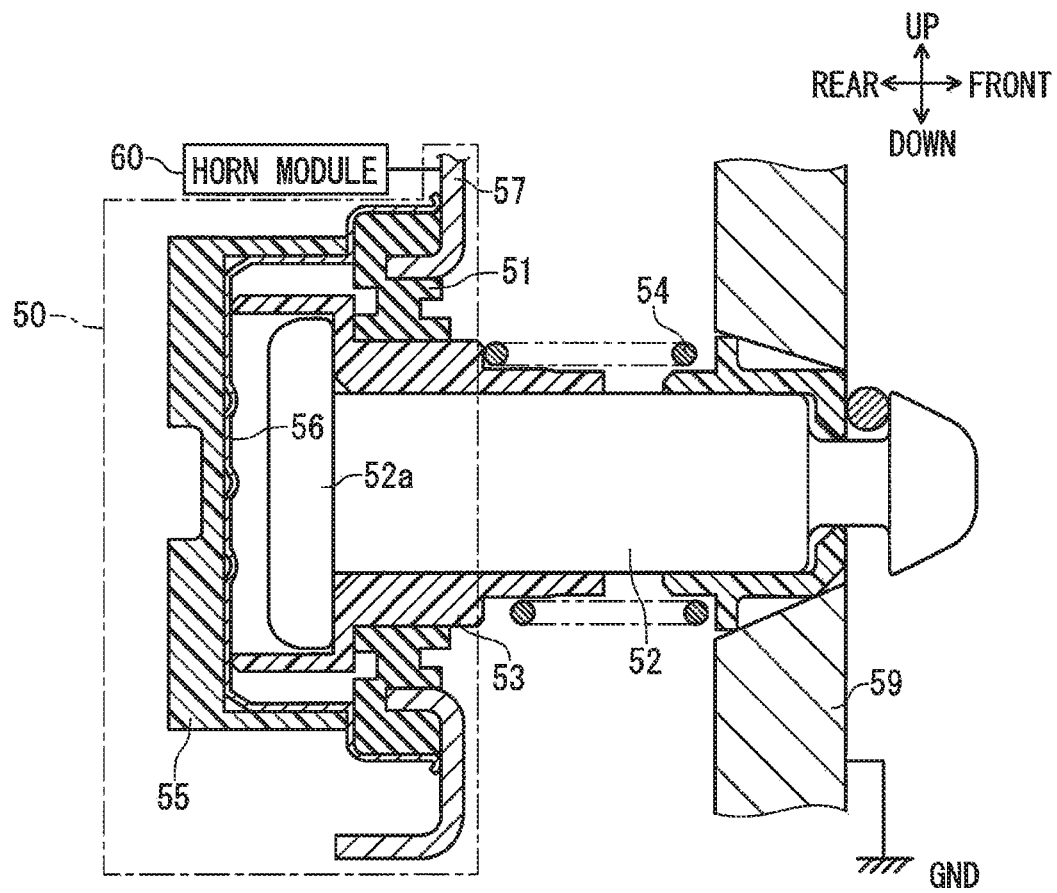
FIG. 10 is a partial sectional view showing a horn switch mechanism and a peripheral portion thereof in a conventional steering wheel.

As shown in FIGS. 6, 7 and 9A, the elastic member 41 is formed of an elastic material such as rubber (for example, EPDM, silicone rubber or the like), elastomer or the like.

A main portion of the elastic member 41 which occupies a rear portion thereof is made up of an elastic main portion 41a having a circular annular shape. A front portion of the elastic member 41 is made up of an elastic cylindrical portion 41b and an elastic plate-shaped portion 41c.

A gap portion G1 is defined between the elastic main body portion 41a and the collar portion 31a. Ribs 41e are formed at portions on a rear surface of the elastic main body portion 41a, and these ribs 41e project to the rear so as to come into contact with corresponding portions on a front surface of the collar portion 31a. In this embodiment, the ribs 41e are formed at a plurality of locations on a circle which is centered at the axis L2 of the snap pin 31 and are each formed into an arc-like shape which follows the circle (refer to FIG. 6). It is desirable that these ribs 41e are provided at three or more locations on the circle from the viewpoint of bringing the ribs 41e into contact with the collar portion 31a stably.

A rear portion of an inner circumferential surface of the elastic main body portion 41a is made up of a tapered surface 41d which expands diametrically wider as it extends to the rear. A gap G2 is defined between the tapered surface 41d of the elastic main body portion 41a and the cylindrical portion 32a of the pin holder 32 in such a condition that the gap G2 communicates the gap G1.

Additionally, an annular projecting portion 41f is provided on an outer circumferential portion at a rear end of the elastic main body portion 41a so as to project radially outwards. The annular projecting portion 41f is spaced away radially inwards from the circumferential wall portion 33b of the contact holder 33.

The elastic cylindrical portion 41b is a cylinder of a small thickness and extends from an inner circumferential portion of the elastic main body portion 41a to the front.

The elastic plate-shaped portion 41c projects radially outwards from a circumferential portion of a front end of the elastic cylindrical portion 41b and is formed into an annular plate of a small thickness. The elastic plate-shaped portion 41c has an outside diameter which is set to be almost the same as an outside diameter of the catch portion 32c (the movement catch portion).

A dimension of the snap pin 31 in a direction along the axis L2 thereof (the front-to-rear direction) is set so that the lengths of the elastic cylindrical portion 41b and the elastic plate-shaped portion 41c and the length of the elastic main body portion 41a are almost the same.

The elastic member 41 (mainly the elastic main body portion 41a) makes up the dynamic damper together with the air bag module 20. In this embodiment, the elastic member 41 (mainly the elastic main body portion 41a) is caused to function as the spring of the dynamic damper, and the air bag module 20 is caused to function as the damper mass.

A resonant frequency in relation to the up-to-down and left-to-right directions of the dynamic damper is set to a target damping frequency, in other words, to a frequency to which the vibrations of the steering wheel 10 in the up-to-down and left-to-right directions are damped by tuning the magnitude (the radial and front-to-rear directions) of the elastic member 41 (the elastic main body portion 41a).

<Damper Holder 42>

The damper holder 42 is formed of an insulating resin material. The damper holder 42 is disposed between the elastic member 41 and the holding portions 21i of the bag holder 21 and on a rear side of the mounting portion 21f of the bag holder 21.

As shown in FIGS. 6 and 9A, a main portion of the damper holder 42 is made up of a circumferential wall portion 42a and a bottom wall portion 42b which is formed on an inner circumferential portion of a front end of the circumferential wall portion 42a.

A rear surface of the circumferential wall portion 42a is in contact with a front surface of the annular projecting portion 41f of the elastic member 41. As shown in FIGS. 6 and 8, engagement claws 42c are formed at a plurality of locations on the circumferential wall portion 42a which are spaced away circumferentially from each other. These engagement claws 42c are brought into engagement with inner sides of the corresponding claw engagement holes 33d in the contact holder 33, whereby the damper holder 42 is attached to the contact holder 33.

Stoppers 42d are formed at a plurality of locations on an outer circumferential portion of the front end of the circumferential wall portion 42a which are spaced away circumferentially from each other and which are spaced away circumferentially from the engagement claws 42c. These stoppers 42d are brought into engagement with the corresponding notches 33e of the contact holder 33, whereby the damper holder 42 is positioned in the front-to-rear direction in relation to the contact holder 33.

As shown in FIGS. 6 and 9A, the bottom wall portion 42b has an annular plate-like shape, and an inner circumferential portion thereof is positioned at the rear of the catch portion 32c. The bottom wall portion 42b is disposed at a location which is spaced away to the front from the elastic main body portion 41a of the elastic member 41. This arrangement defines an annular gap portion G3 between the bottom wall portion 42b and the elastic main body portion 41a.

An annular transmitting portion 42e projects from the inner circumferential portion of the bottom wall portion 42b to the front. This transmitting portion 42e is inserted through the mounting hole 21g in the bag holder 21 and is brought into contact with the elastic plate-shaped portion 41c of the elastic member 41 in a position lying immediately behind the catch portion 32c of the pin holder 32. To describe this differently, the transmitting portion 42e is brought into indirect contact with the catch portion 32c via the elastic plate-shaped portion 41c.

The transmitting portion 42e is disposed at a location which is spaced away radially outwards from the elastic cylindrical portion 41b of the elastic member 41. This arrangement defines an annular gap G4 between the elastic cylindrical portion 41b and the transmitting portion 42e in such a way as to communicate with the gap portion G3.

In such a state that each horn switch mechanism 30 is attached to the bag holder 21 via the elastic member 41 and the damper holder 42 in the way described above, the pin holder 32 supports the bag holder 21 so as to move in the front-to-rear direction relative to the snap pin 31 while preventing the contact between the snap pin 31 and the bag holder 21, that is, while keeping them in the insulated state. Additionally, the pin holder 32 transmits a rearward biasing force of the coil spring 36 to the collar portion 31a of the snap pin 31.

In addition, the pair of holding portions 21i enter between the damper holder 42 and the side portions 34b of the contact terminal 34. The side portions 34b are brought into contact with outer surfaces of the holding portions 21*i* by the hook portions 33*c* of the contact holder 33. An electrical communication is established between the bag holder 21 and the contact terminal 34 by the contact of the side portions 34*b* with the holding portions 21*i*.

Further, front end portions of the side portions 34*b* which are biased by the hook portions 33*c* are locked by the holding portions 21*i*. The side portions 34*b* prevent the contact holder 33 and thus the horn switch mechanism 30 from moving from the bag holder 21 to the rear.

Next, an operation of assembling the air bag module 20 to the metal core 12 via the plurality of horn switch mechanism 30 will be described.

In starting this operation, the snap pin 31 of each horn switch mechanism 30 is inserted into the through hole 12*c* in the corresponding holding portion 12*b* of the metal core 12 from the rear. In association with the insertion of the snap pin 31, the catch portion 35*b* of the spring catch 35 approaches the holding portion 12*b*, and the engagement pieces 35*e* approach the inner wall surface of the through hole 12*c*. Additionally, the front end 31*c* of the shaft portion 31*f* of the snap pin 31 is brought into contact with the clip 13. Further, when the snap pin 31 and the like are caused to move to the front against the biasing force of the clip 13, the clip 13 is elastically deformed radially outwards of the snap pin 31. Then, when the snap pin 31 is caused to move to a location where the locking groove 31*b* faces the clip 13, the clip 13 attempts to enter the locking groove 31*b* by means of its own elastic restoring force.

On the other hand, the claw portions 35*d* of the spring catch 35 which is biased to the front by the coil spring 36 are fitted to stay in the locking groove 31*b*. Because of this, in the process of the clip 13 entering the interior of the locking groove 31*b*, the clip 13 enters between the claw portions 35*d* and a front wall surface 31*d* in the locking groove 31*b* while compressing the coil spring 36 to the rear. As a result of the clip 13 entering the locking groove 31*b* in this way, the claw portions 35*d* are positioned at a rear side of the clip 13 in the locking groove 31*b*. A portion of the clip 13 which is positioned at the front of the through hole 12*c* is held from the front and rear by the claw portions 35*d* which are biased to the front by the coil spring 36 and the front wall surface 31*d* of the locking groove 31*b*, whereby the movement of the clip 13 is restricted. On the other hand, the snap pin 31 is restricted from moving in the front-to-rear direction by the clip 13 which has entered the locking groove 31*b*. As a result of the snap pin 31 being locked on the metal core 12 by the clip 13 in the way described above, each horn switch mechanism 30 is fastened to the metal core 12 and the air bag module 20 is mounted on the metal core 12. The construction in which the snap pin 31 is locked on the metal core 12 by means of the elasticity of the clip 13 in association with the snap pin 31 being inserted through the insertion hole 12*c* is also called a snap-fit construction.

In the assembled state through the snap-fit construction, the outer surfaces of the engagement pieces 35*e* are in contact with the inner wall surface of the through hole 12*c*. Additionally, the claw portions 35*d* are spaced slightly away to the front from a rear wall surface 31*e* in the locking groove 31*b*. In this way, the spring catch 35 is interposed between the inner wall surface of the through hole 12*c* and the snap pin 31.

In addition, in the assembled state, the snap pin 31 of each horn switch mechanism 30 which is locked on the metal core 12 supports the bag holder 21 of the air bag module 20 so as to reciprocate relative to the metal core 12 via the pin holder 32, that is, so as to move towards and away from the metal core 12.

Next, the function of the steering wheel 10 of this embodiment which is configured as described above will be described.

At normal times when the vehicle is free from a frontal application of impact that would result from a frontal collision, no gas is jetted from the gas jetting portion 23*e* of the inflator 23 in the air bag module 20, and the air bag is held folded.

At the normal times described above, when the air bag module 20 is not depressed, as shown in FIGS. 7 and 8, the contact projecting portions 34*c* of the contact terminal 34 are spaced away to the rear from the rear end portion (the fixed-side contact portion) of the snap pin 31. This brings the contact terminal 34 and the snap pin 31 into an electrically cut off state, and the horn module 40 is not activated to operate. As this is occurring, a rearward biasing force of the coil spring 36 is applied to the collar portion 31*a* of the snap pin 31 which is locked on the metal core 12 by the clip 13 via the pin holder 32.

Additionally, a forward biasing force of the coil spring 36 is applied to the spring catch 35 through the catch portion 35*b*, and the claw portions 35*d* of the spring catch 35 which have entered the locking groove 31*b* of the snap pin 31 push the clip 13 in the locking groove 31*b* to the front. Being pushed in that way, the clip 13 is caught and held from the front and rear by the front wall surface 31*d* in the locking groove 31*b* and the claw portions 35*d*, whereby the clip 13 is restricted from moving.

Further, the pin holder 32 is interposed between the shaft portion 31*f* of the snap pin 31 and the side portions 34*b* of the contact terminal 34 to put the shaft portion 31*f* and the side portions 34*b* in an electrically insulated state.

As this occurs, the load of the air bag module 20 is transmitted to the pin holder 32 via mainly the contact holder 33, the damper holder 42 and the elastic member 41.

Here, the rear end portion of the cylindrical portion 32*a* of the pin holder 32 is spaced away to the front from the top plate portion 33*a* of the contact holder 33. This prevents the load of the air bag module 20 from being transmitted directly to the pin holder 32 via the contact holder 33.

Because of this, when the vehicle is being driven at high speeds or the engine mounted on the vehicle is idling at the normal times, in case vibration in the up-to-down direction or left-to-right direction is transmitted to the steering wheel 10, this vibration is then transmitted to the air bag module 20 via the metal core 12 and the horn switch mechanisms 30.

In case the vibration is transmitted to the steering wheel 10 in the way described above, the air bag module 20 functions as the damper mass of the dynamic damper and the elastic member 41 functions as the spring of the dynamic damper in response to the transmission of the vibration. The elastic member 41 vibrates (resonates) in the up-to-down direction and left-to-right direction together with the air bag module 20 while being elastically deformed at a resonant frequency which is the same as or near the frequency at which the steering wheel 10 vibrates to thereby absorb the vibration energy of the steering wheel 10. This absorption of the vibration energy restricts (damps) both the vibration in the up-to-down direction and the vibration in the left-to-right direction of the steering wheel 10.

As this occurs, the rear end portion of the cylindrical portion 32*a* of the pin holder 32 does not rub against the top plate portion 33*a* of the contact holder 33, and no sliding resistance is generated between the cylindrical portion 32*a* and the top plate portion 33a. This eliminates the influence of sliding resistance on the resonant frequency, which stabilizes the resonant frequency. Additionally, although vibration inputted from the vehicle side changes, a target resonant frequency of the dynamic damper is made difficult to change. In particular, even though vibration to be inputted is small, the sliding resistance does not become dominant over the resonant frequency, this making it difficult for the resonant frequency to become high.

The rear end portion of the cylindrical portion 32a which is placed slidably on the shaft portion 31f of the snap pin 31 makes up the rear end portion of the pin holder 32. However, this rear end portion of the cylindrical portion 32a is positioned further forwards than the collar portion 31a of the snap pin 31. This means that no constituent portion of the pin holder 32 is present further rearwards than the rear end portion of the cylindrical portion 32a. Consequently, no constituent portion of the pin holder 32 is present not only further rearwards than the collar portion 31a at the rear end portion of the snap pin 31 but also around the collar portion 31a. As a result of this, should the pin holder 32 have a portion which surrounds the collar portion 31a at a rear portion thereof, there would be fears that the portion surrounding the collar portion 31a is brought into contact with the circumferential wall portion 33b of the contact holder 33 when the vehicle is being driven on rough roads. However, with this embodiment, this contact is made difficult to happen.

Additionally, the gap portions G1, G3 are defined at the front and rear of the elastic main body portion 41a, and this also allows the elastic main body portion 41a to be elastically deformed in the direction along the axis L2 of the snap pin 31 (in the front-to-rear direction) in those gap portions G1, G3. Compared with a case where the gap portions G1, G3 are not defined, the elastic main body portion 41a is allowed to be elastically deformed more easily in the direction along the axis L2 of the snap pin 31. Consequently, it becomes easy that the elastic main body portions 41a are caused to vibrate together with the air bag module 20 while being elastically deformed at a target resonant frequency.

On the other hand, in case the whole of the rear surface of the elastic main body portion 41a is spaced away from the collar portion 31a, in the event that the elastic main body portion 41a and the collar portion 31a are brought into contact with each other, a striking sound is generated more or less. However, the ribs 41e which projects from the portions of the rear surface of the elastic main body portion 41a to the rear are in contact with the portions on the front surface of the collar portion 31a at all times. This dampens the impetus with which the collar portion 31a and the elastic main body portion 41a approach each other, restricting the generation of a striking sound associated with the contact thereof by the 41e being elastically deformed.

Additionally, since the gap portion G2 is defined between the tapered surface 41d of the elastic main body portion 41a and the cylindrical portion 32a of the pin holder 32, the elastic member 41 is also allowed to be elastically deformed in this gap portion G2. Compared with a case where the gap portion G2 is not defined, the elastic member 41 is allowed to be elastically deformed more easily in the radial direction and the like.

Further, the gap portion G4 is defined between the elastic cylindrical portion 41b and the transmitting portion 42e, which allows the elastic cylindrical portion 41b to be elastically deformed in the radial direction in this gap portion G4. Compared with a case where the gap portion G4 is not defined, the elastic cylindrical portion 41b is allowed to be elastically deformed more easily in the radial direction.

The generation of a striking sound is restricted by the annular projecting portion 41f which will result from the circumferential wall portion 42a being brought into contact with the collar portion 31a when the elastic main body portion 41a is deformed in the direction along the axis L2 of the snap pin 31.

Although the thickness of the elastic plate-shaped portion 41c of the elastic member 41 is small, the elastic plate-shaped portion 41c has elasticity more or less. Because of this, the transmitting portion 42e which is hard and the catch portion 32c which is also hard are restricted from being brought into direct contact with each other by interposing the elastic plate-shaped portion 41c between the transmitting portion 42e and the catch portion 32c, whereby the generation of a striking sound, which will result from a contact of those hard portions, is restricted.

On the other hand, at the normal times, when the air bag module 20 is depressed to activate the horn module 40, a force applied to the air bag module 20 is transmitted to at least one of the horn switch mechanisms 30 and thus to the contact terminal 34 and the damper holder 42 via the contact holder 33 thereof. Then, the damper holder 42 is pushed to the front, and the movement of the damper holder 42 is transmitted to the pin holder 32 via the transmitting portion 42e and the catch portion 32c. Namely, although the transmitting portion 42e moves to the front together with the damper holder 42, the movement of the transmitting portion 42e is transmitted indirectly to the catch portion 32c which is positioned directly before the transmitting portion 42e via the elastic plate-shaped portion 41c of the elastic member 41. The catch portion 32c not only functions to catch the rearward biasing force of the coil spring 36 but also functions as the movement catch portion to catch the forward acting force which is transmitted from the damper holder 42 (the transmitting portion 42e).

The force so transmitted causes the pin holder 32 to slide to the front along the shaft portion 31f of the snap pin 31 against the coil spring 36. Additionally, the contact terminal 34 moves to the front together with the contact holder 33.

As this occurs, the coil spring 36 is compressed as the air bag module 20 is depressed to thereby increase the repulsive force, and therefore, the operation load is increased, improving the operation feeling.

In the case of the elastic plate-shaped portion 41c which is formed on the outer circumferential portion of the front end of the elastic member 41 being interposed between the transmitting portion 42e and the catch portion 32c as described above, the elastic plate-shaped portion 41c is elastically deformed when the damper holder 42 is caused to move to the front. As this occurs, should the elastic member 41 be elastically deformed largely, although the air bag module 20 is depressed, the operation load is not increased as expected, deteriorating the operation feeling.

In this embodiment, however, the elastic plate-shaped portion 41c is elastically deformed in a slight amount since the elastic plate-shaped portion 41c has the small thickness. Because of this, the elastic deformation of the elastic plate-shaped portion 41c affects slightly the operation feeling that is felt by the driver when he or she depresses the air bag module.

Then, when at least one of the plurality of contact projecting portions 34c of the contact terminal 34 is brought into contact with a rear end face of the snap pin 31, the metal core 12, which is connected to a ground GND (a body ground), is allowed to communicate electrically with the bag holder 21 via the clip 13, the snap pin 31 and the contact terminal 34. This electrical communication closes the horn switch mechanism 30, whereby the horn module 40, which is electrically connected with the bag holder 21, is activated.

Incidentally, when impact is applied to the vehicle from the front thereof as a result of a frontal collision, the driver tends to be pushed to the front from the head due to the inertia. On the other hand, in the air bag module 20, the inflator 23 is activated in response to the application of impact, and gas is jetted out of the gas jetting portion 23e. This gas is supplied into the air bag, whereby the air bag is deployed and inflated. Then, as the pressure applied to the outer skin 24a of the pad portion 24 is increased by the air bag which is being deployed and inflated, the outer skin portion 24a is broken at the thin portion 24c. Then, the air bag continues to be deployed and inflated to the rear through an opening formed as a result of the breakage of the outer skin portion 24a. The air bag which has been deployed and inflated is interposed in front of the driver who is pushed to the front by the impact generated as a result of the frontal collision to restrain the driver from being pushed to the front further, whereby the driver is protected from the impact.

When the air bag is inflated to the rear, the force acting to the rear is applied to the bag holder 21. In this respect, in this embodiment, the snap pins 31 of the horn switch mechanism 30 are supported on the metal core 12 (the holding portion 12b). The collar portions 31a which are formed at the rear end portions of the snap pins 31 are positioned further rearwards than the mounting holes 21g in the bag holder 21. Moreover, the collar portions 31a each have the outside diameter which is greater than the bore diameter of the mounting holes 21g. Because of this, in the case of the bag holder 21 moving to the rear, the collar portions 31a are brought into contact with the circumferential portions of the mounting holes 21g in the bag holder 21 to thereby function as stoppers. Because of this, the excessive rearward movement of the bag holder 21 and thus the air bag module 20 is restricted by the collar portions 31a of the snap pins 31.

According to the embodiment which has been described in detail heretofore, the following advantages can be obtained.

(1) The elastic member 41 is interposed between the pin holder 32 (the slider) which is disposed slidably on the outer side of the shaft portion 31f of the snap pin 31 (the support member) and the damper holder 42 which is mounted inside the contact holder 33 (the cap member). The transmitting portion 42e is provided in the inner circumferential portion of the damper holder 42. The catch portion 32c is provided on the outer circumferential portion of the pin holder 32 at the location lying immediately before the transmitting portion 42e as the movement catch portion. Then, the forward movement of the damper holder 42 associated with the depression of the air bag module 20 is transmitted to the pin holder 32 by the transmitting portion 42e and the catch portion 32c (FIGS. 7, 8).

This allows the horn switch mechanisms 30 not only to function to support the air bag module 20 but also to function to switch on the horn module 40 although the top plate portion 33a of the contact holder 33 is spaced away to the rear from the rear end portion of the pin holder 32.

Additionally, as a result of the top plate portion 33a being spaced away from the rear end portion of the pin holder 32, the pin holder 32 is prevented from rubbing against the top plate portion 33a when the air bag module 20 is not depressed, whereby the influence imposed on the resonant frequency by the sliding resistance is eliminated, thereby making it possible to stabilize the resonant frequency. Additionally, although the vibration inputted from the vehicle side changes, the resonant frequency is made difficult to change. As a result of this, it is possible to restrict the vibration of the steering wheel 10 with the stabilized resonant frequency.

Further, when the air bag module 20 is depressed to activate the horn module 40, the force applied to the air bag module 20 can be transmitted to the pin holder 32 (the slider) via the contact holder 33 (the cap member) and the damper holder 42, thereby making it possible to allow the pin holder 32 to move to the front against the coil spring 36 (the biasing member). As a result of this, the operation load of the air bag module 20 can be increased according to the depression amount of the air bag module 20, whereby the operation feeling of the air bag module 20 can be improved.

(2) The transmitting portion 42e is brought into indirect contact with the movement catch portion (the catch portion 32c) via the elastic plate-shaped portion 41c which is formed on the outer circumferential portion of the front end of the elastic member 41 (FIG. 9A).

Because of this, when the air bag module 20 is depressed, the forward movement of the transmitting portion 42e associated with the forward movement of the damper holder 42 can be transmitted indirectly to the movement catch portion (the catch portion 32c) via the elastic plate-shaped portion 41c. This enables the pin holder 32 (the slider) to move to the front against the coil spring 36. As a result of this, it is possible to obtain preferably the advantage described under (1) above.

(3) The catch portion 32c provided on the outer circumferential portion of the pin holder 32 (the slider) is caused to function as the movement catch portion which is the location where the rearward biasing force of the coil spring 36 is caught (FIG. 9A).

This obviates the necessity of forming a movement catch portion separately from the catch portion 32c, and compared with a case where the movement catch portion is formed separately, the shape of the pin holder 32 can be simplified.

(4) The main portion of the pin holder 32 (the slider) is made up of the cylindrical portion 32a which is placed slidably on the shaft portion 31f of the snap pin 31 (the support member), and the rear end portion of the pin holder 32 (the slider) is made up of the rear end portion of the cylindrical portion 32a (FIGS. 7, 8).

Because of this, being different from a case where the pin holder 32 has a portion which surrounds the collar portion 31a at the rear portion thereof, the rear end portion of the pin holder 32 can be prevented from being brought into contact with the circumferential wall portion 33b of the contact holder 33 when the vehicle is being driven on rough roads.

(5) The rear portion of the elastic member 41 is made up of the annular elastic main body portion 41a which functions as the spring of the dynamic damper. The gap portion G1 is defined between the elastic main body portion 41a and the collar portion 31a of the snap pin 31. The ribs 41e are provided at the portions on the rear surface of the elastic main body portion 41a, and the ribs 41e project to the rear to be brought into contact with the corresponding portions on the front surface of the collar portion 31a (FIGS. 6, 9A).

Because of this, compared with a case where the gap portion G1 is not formed, the elastic main body portion 41a is made easier to be elastically deformed in the direction along the axis L2 of the snap pin 31 (the front-to-rear direction), whereby the elastic main body portion 41a can elastically be deformed easily at the target resonant frequency.

In addition, being different from a case where the whole of the rear surface of the elastic main body portion 41a is spaced away from the collar portion 31a, the generation of a striking sound associated with the contact of the elastic main body portion 41a with the collar portion 31a can be restricted by the ribs 41e.

(6) Part of the front portion of the elastic member 41 is made up of the elastic cylindrical portion 41b which extends to the front from the elastic main body portion 41a. The gap portion G4 is defined between the elastic cylindrical portion 41b and the transmitting portion 42e (FIG. 9A).

Because of this, compared with a case where the gap portion G4 is not defined, the elastic cylindrical portion 41b is allowed to elastically be deformed in the radial direction more easily, whereby the elastic cylindrical portion 41b can reduce the influence imposed on the resonant frequency by the elastic main body portion 41a.

The embodiment can also be carried out as a modified example in which the embodiment is modified as follows.

<As to Pin Holder 32 (Slider)>

The movement catch portion on the cylindrical portion 32a of the pin holder 32 may be provided at a location which is different from the location where the catch portion 32c is provided.

The movement catch portion may be formed integrally with or separately from the cylindrical portion 32a.

<As to Contact Holder 33 (Cap Member)>

The contact holder 33 may cover, in addition to the respective rear end portions of the snap pin 31 and the pin holder 32, the portion which lies further forwards than those rear end portions from the rear.

<Biasing Member>

A spring which is of a different type from the coil spring or an elastic member which is different from a spring may be used as the biasing member on condition that those replacements can bias the pin holder 32 (the slider) to the rear.

<As to Elastic Member 41>

As the elastic member 41, an elastic member may be used which has a different shape from that the shape described in the embodiment. In association with this, the shapes of the pin holder 32 and the damper holder 42 may also be changed.

At least one of the gap portions G1, G2, G4 may be omitted.

The elastic member 41 may be formed integrally with the cylindrical portion 32a of the pin holder 32. This is made possible by executing, for example, a so-called insert molding in which the pin holder 32 is disposed in a mold as an insert member, and an elastic material is poured on an outer side of the cylindrical portion 32a of the pin holder 32.

The elastic plate-shaped portion 41c does not necessarily have the annular shape.

Figure 9B:
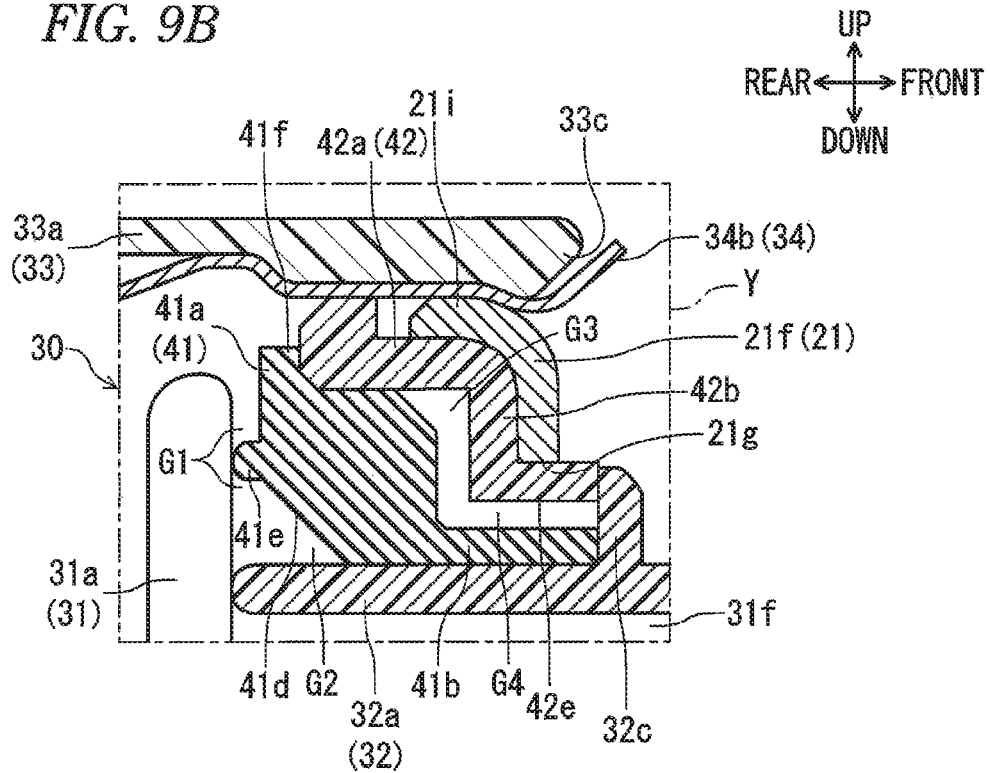
FIG. 9B is a partial vertical sectional view showing a portion Y in FIG. 7 in an enlarged fashion according to an alternate embodiment.

The elastic plate-shaped portion 41c may be omitted from the elastic member 41. As this occurs, the transmitting portion 42e of the damper holder 42 is brought into direct contact with the catch portion 32c (the movement catch portion) of the pin holder 32 (FIG. 9B).

The ribs 41e may be omitted. As this occurs, the gap portion G1 between the elastic main body portion 41a and the collar portion 31a may be defined or may not be defined.

The size of the gap portion G2 between the tapered surface 41d and the cylindrical portion 32a may be changed by changing the shape of the elastic member 41. The target damping frequency can be changed by the change in size of the gap portion G2. For example, the damping frequency can be reduced by increasing the size of the gap portion G2.

<As to Damper Holder 42>

The transmitting portion 42e does not necessarily have the annular shape. The transmitting portion 42e may be formed into arc-shaped portions which are provided at a plurality of locations on a circle which is centered at the axis L2 of the snap pin 31 so as to follow the circle.

<Others>

The steering wheel can also be applied to a steering wheel of a steering system of an airplane, a boat or the like, in addition to the vehicle such as the motor vehicle.

What is claimed is:

1. A steering wheel comprising:
   a support member which is inserted through a bag holder of an air bag module;
   a cylindrical slider which is disposed on an outer side of the support member so as to slide in a front-to-rear direction and which is biased to the rear by a biasing member;
   a cap member which covers at least respective rear end portions of the support member and the slider from the rear in such a state that the cap member is spaced away to the rear from the rear end portion of the slider;
   a movable-side contact portion which is provided inside the cap member;
   an annular damper holder which is mounted inside the cap member while covering part of the slider;
   an annular elastic member which is interposed between the slider and the damper holder;
   a transmitting portion which is provided in an inner circumferential portion of the damper holder; and
   a movement catch portion which is provided on an outer circumferential portion of the slider so as to be positioned before the transmitting portion and to which a forward movement of the damper holder is transmitted through the transmitting portion, wherein
   when the air bag module is not depressed, the air bag module is caused to function as damper mass of a dynamic damper and the elastic member is caused to function as a spring of the dynamic damper, whereas when the air bag module is depressed, the slider is caused to slide to the front against the biasing member by causing the cap member to move to the front in association with the depression of the air bag module, and in the sliding process, the movable-side contact portion is brought into contact with the rear end portion of the support member to thereby activate a horn module.

2. The steering wheel according to claim 1, wherein
the transmitting portion is in direct contact with the movement catch portion or is in contact with the movement catch portion indirectly via an elastic plate-shaped portion which is formed on an outer circumferential portion of a front end of the elastic member.

3. The steering wheel according to claim 1, wherein:
the movement catch portion catches a rearward biasing force of the biasing member.

4. The steering wheel according to claim 1, wherein:
the support member comprises a shaft portion which extends in a depressing direction of the air bag module and a collar portion which is formed on an outer circumferential portion of a rear end of the shaft portion;
a main portion of the slider is made up of a cylindrical portion which is placed on the shaft portion slidably; and
a rear end portion of the cylindrical portion makes up the rear end portion of the slider.

5. The steering wheel according to claim 4, wherein:
at least a rear portion of the elastic member is made up of an annular elastic main body portion which functions as the spring of the dynamic damper;
a gap portion is defined between the elastic main body portion and the collar portion; and
a rib is provided at a portion on a rear surface of the elastic main body portion so as to project to the rear to thereby be brought into contact with a portion on a front surface of the collar portion.

6. The steering wheel according to claim 5, wherein:
the elastic member comprises an elastic cylindrical portion which extends to the front from the elastic main body portion; and
a gap portion is defined between the elastic cylindrical portion and the transmitting portion.

7. The steering wheel according to claim 1, wherein:
the movement catch portion is positioned immediately before the transmitting portion.

* * * * *